United States Patent
Ylamurto et al.

(10) Patent No.: US 12,513,643 B2
(45) Date of Patent: Dec. 30, 2025

(54) METHOD FOR CLOCK SYNCHRONIZATION VIA DIFFERENTIAL CHANNEL STATE INFORMATION

(71) Applicant: ZaiNar, Inc., Redwood City, CA (US)

(72) Inventors: Tommi Ylamurto, Redwood City, CA (US); Philip A. Kratz, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 0 days.

(21) Appl. No.: 18/764,745

(22) Filed: Jul. 5, 2024

(65) Prior Publication Data
US 2025/0016709 A1    Jan. 9, 2025

Related U.S. Application Data

(60) Provisional application No. 63/527,774, filed on Jul. 19, 2023, provisional application No. 63/525,351, filed on Jul. 6, 2023.

(51) Int. Cl.
| | |
|---|---|
| *H04L 5/00* | (2006.01) |
| *H04B 7/06* | (2006.01) |
| *H04J 3/06* | (2006.01) |
| *H04W 56/00* | (2009.01) |

(52) U.S. Cl.
CPC ........ *H04W 56/009* (2013.01); *H04B 7/0626* (2013.01); *H04J 3/0658* (2013.01); *H04L 5/0053* (2013.01)

(58) Field of Classification Search
CPC ..... H04W 56/00; H04B 7/0626; H04J 3/0658
See application file for complete search history.

(56) References Cited

U.S. PATENT DOCUMENTS

| | | | |
|---|---|---|---|
| 11,658,798 B1* | 5/2023 | Kratz | G01S 11/08 375/368 |
| 2005/0002481 A1 | 1/2005 | Woo et al. | |
| 2005/0282558 A1 | 12/2005 | Choi et al. | |

(Continued)

OTHER PUBLICATIONS

3GPP TSG RAN WG1 meeting#92b, R1-1804912 Title:Reduced system acquisition time (Year: 2018).*

(Continued)

*Primary Examiner* — Christopher M Crutchfield
*Assistant Examiner* — Abusayeed M Haque
(74) *Attorney, Agent, or Firm* — Run8 Patent Group, LLC; Peter Miller; Brian T. Chew

(57) ABSTRACT

A method includes: based on a synchronization signal transmitted from a master node and received at a sniffer node, recording a partial channel state information characterizing a communication channel between the master node and the sniffer node for a second time period; in response to a localization signal transmitted from a target device, calculating a time bias between the master node and the sniffer node based on a transmit time of the synchronization signal, a third receive time of the synchronization signal at the sniffer node, a channel response characterizing the communication channel for a first time period, and the partial channel state information; and estimating a position of the target device based on a first receive time of the localization signal at the master node, a second receive time of the localization signal at the sniffer node, and the time bias.

18 Claims, 8 Drawing Sheets

(56) References Cited

U.S. PATENT DOCUMENTS

| | | | |
|---|---|---|---|
| 2010/0189206 A1* | 7/2010 | Kagan | H04J 3/0697 |
| | | | 375/354 |
| 2014/0051460 A1 | 2/2014 | Dua et al. | |
| 2023/0009717 A1* | 1/2023 | Bilstad | G01S 5/0284 |
| 2023/0011851 A1 | 1/2023 | Bilstad et al. | |

OTHER PUBLICATIONS

International Search Report and Written Opinion for International Application No. PCT/US24/36891 mailed on Nov. 15, 2024; 19 pages.

Notification of the International Application Number and of the International Filing Date for International Application No. PCT/US24/36891 mailed on Jul. 24, 2024; 1 page.

* cited by examiner $$csi_h = csi_{coarse} \cdot csi_m \cdot csi_s = e^{j\omega(\tau_{MT}+\tau_{MR}+\tau_{ST}+\tau_{SR}+2\cdot\tau_{los})}(1+h)^2 \cdot a \cdot e^{j\Theta_1} \quad (8)$$

The CSI of sniffer node receiving a multicast synchronization signal at at $t_{sa}$:

$$csi_a = e^{j\omega\Delta_a}(1+h) \cdot a \cdot e^{j\Theta_2} \quad (9)$$

FIGURE 2B

METHOD FOR CLOCK SYNCHRONIZATION VIA DIFFERENTIAL CHANNEL STATE INFORMATION

CROSS-REFERENCE TO RELATED APPLICATIONS

This application claims the benefit of U.S. Provisional Application No. 63/527,774, filed on 19 Jul. 2023, and U.S. Provisional Application No. 63/525,351, filed on 6 Jul. 2023, each of which is incorporated in its entirety by this reference.

TECHNICAL FIELD

This invention relates generally to the field of network-based positioning and more specifically to a new and useful method for clock synchronization via differential channel state information within the field of network-based positioning.

BRIEF DESCRIPTION OF THE FIGURES

FIGS. 2A and 2B are flowchart representations of one variation of the method;

DESCRIPTION OF THE EMBODIMENTS

Figure 1:
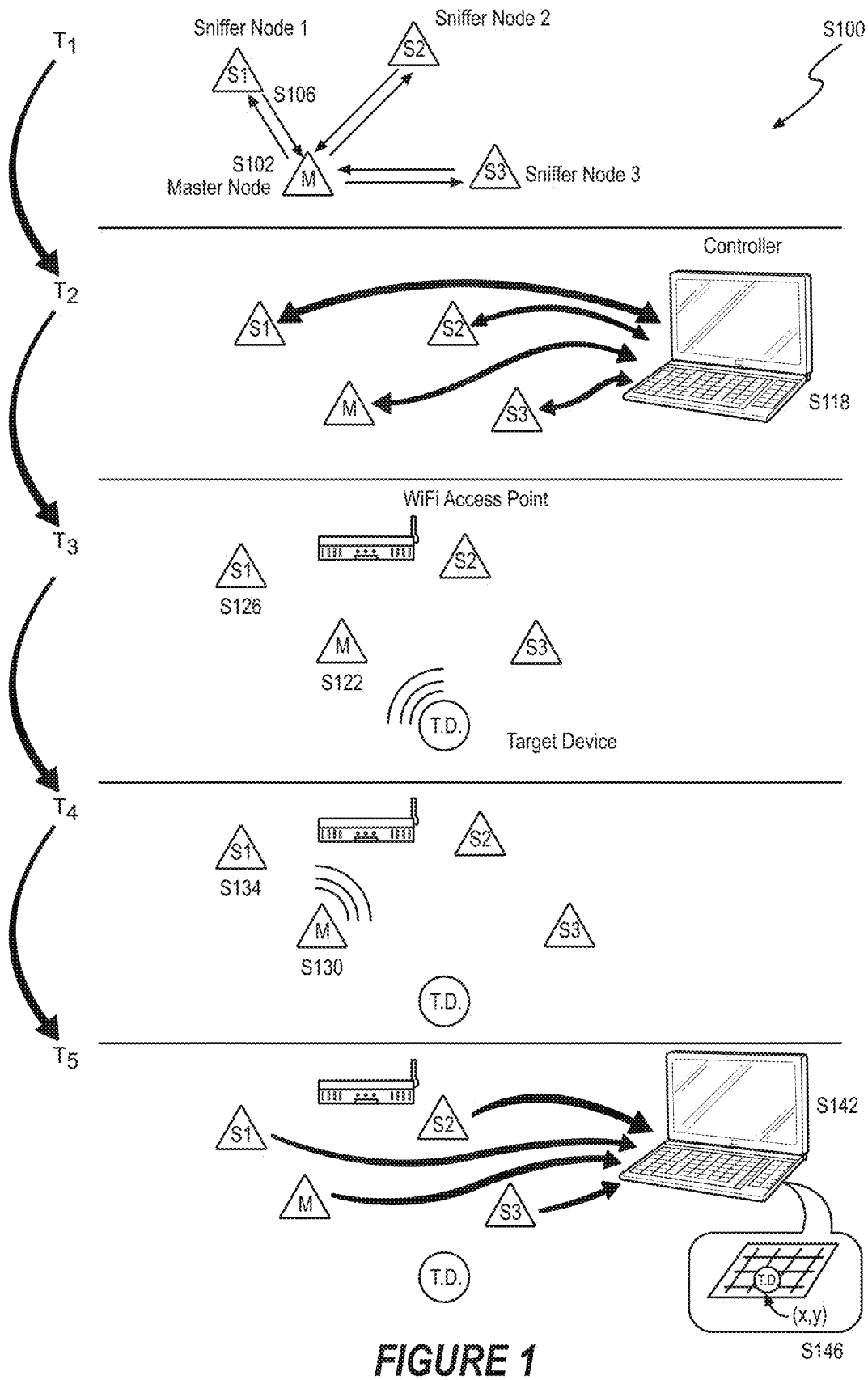
FIG. 1 is a flowchart representation of a method.
Figure 2A:
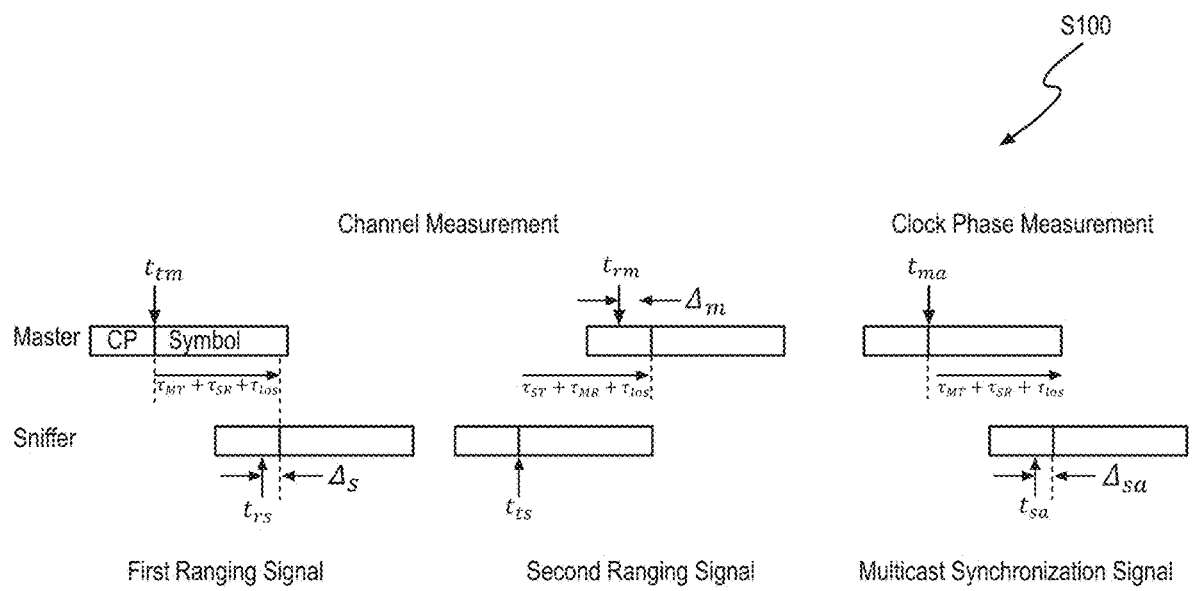

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

As shown in FIGS. 1, 2A, 2B, 3, 4, 5, and 6, a method S100 includes, at a first node in a set of nodes: receiving a first signal transmitted from a target device in Block S122; recording a first receive time of the first signal at the first node in Block S124; transmitting a second signal from the first node in Block S130; and recording a transmit time of the second signal from the first node in Block S132.

The method S100 also includes, at a second node in the set of nodes: receiving the first signal transmitted from the target device in Block S126; recording a second receive time of the first signal at the second node in Block S128; receiving the second signal transmitted from the first node in Block S134; recording a third receive time of the second signal at the second node in Block S136; and, based on the second signal, recording a first partial channel state information characterizing a communication channel between the first node and the second node for a second time period in Block S138.

The method S100 further includes: accessing a first channel response characterizing the communication channel between the first node and the second node for a first time period preceding the second time period in Block S140; in response to the first signal, calculating a time bias between the first node and the second node based on the transmit time of the second signal from the first node, the third receive time of the second signal at the second node, the first channel response, and the first partial channel state information in Block S142; and estimating a target position of the target device based on the first receive time of the first signal at the first node, the second receive time of the first signal at the second node, and the time bias in Block S146.

1.1 Variation: Measurement Grouping

As shown in FIGS. 1, 2A, 2B, 3, 4, 5, 6, and 7, one variation of the method S100 includes, at a first node in a set of nodes: receiving a first subset of signals in a set of signals transmitted from a target device in Block S122, the first subset of signals including a first signal; recording a first set of receive times of the first subset of signals at the first node in Block S124, the first set of receive times including a first receive time of the first signal at the first node; transmitting a second signal from the first node in Block S130; and recording a transmit time of the second signal from the first node in Block S132.

This variation of the method S100 also includes, at a second node in the set of nodes: receiving a second subset of signals in the set of signals transmitted from the target device in Block S126, the second subset of signals including the first signal; recording a second set of receive times of the second subset of signals at the second node in Block S128, the second set of receive times including a second receive time of the first signal at the second node; receiving the second signal transmitted from the first node in Block S134; recording a third receive time of the second signal at the second node in Block S136; and, based on the second signal, recording a first partial channel state information characterizing a communication channel between the first node and the second node for a second time period in Block S138.

This variation of the method S100 further includes: accessing a first channel response characterizing the communication channel between the first node and the second node for a first time period preceding the second time period in Block S140; in response to the first signal, calculating a time bias between the first node and the second node based on the transmit time of the second signal from the first node, the third receive time of the second signal at the second node, the first channel response, and the first partial channel state information in Block S142; and estimating a target position of the target device based on the first set of receive times of the first subset of signals at the first node, the second set of receive times of the second subset of signals at the second node, and the time bias in Block S146.

1.2 Variation: Sniffer Node

As shown in FIGS. 1, 2A, 2B, 3, 4, 5, and 6, one variation of the method S100 includes, at a sniffer node in a set of nodes: receiving a first signal transmitted from a target device in Block S126; recording a second receive time of the first signal at the second node in Block S128; receiving a second signal transmitted from a master node in the set of nodes in Block S134; recording a third receive time of the second signal at the sniffer node in Block S136; and, based on the second signal, recording a first partial channel state information characterizing a communication channel between the master node and the sniffer node for a second time period in Block S138.

This variation of the method S100 also includes: accessing a first channel response characterizing the communication channel between the master node and the sniffer node for a first time period preceding the second time period in Block S140; in response to the first signal, calculating a clock phase difference between the master node and the sniffer node based on a transmit time of the second signal from the master node, the third receive time of the second signal at the sniffer node, the first channel response, and the first partial channel state information in Block S142; and estimating a target position of the target device based on a first receive time of the first signal at the master node, the second receive time of the first signal at the sniffer node, and the clock phase difference in Block S146.

2. Applications

Generally, a system—including or interfacing with a set of nodes (e.g., transceivers, Wi-Fi access points), a target device (e.g., a Wi-Fi device), and/or a remote computer system (e.g., a remote server)—can execute Blocks of the method S100: to intercept a wireless signal (e.g., a Wi-Fi signal) transmitted by the target device; to record times of receipt of this wireless signal within the set of nodes at internal clock times of these nodes; to selectively and retroactively execute a synchronization cycle to derive clock offsets (or "time biases") between these nodes immediately after receipt of this wireless signal from the target device; and then to derive a position of the target device based on the clock offsets and times of receipt of this wireless signal at the set of nodes.

Therefore, by executing the synchronization cycle immediately after receipt of the wireless signal, the system can reduce a time difference between the synchronization cycle and receipt of the wireless signal in order to improve accuracy of arrival time estimation of the wireless signal at these nodes, thereby improving accuracy of position estimation for the target device.

More specifically, rather than consuming bandwidth to time-synchronize clocks (e.g., compute clock offsets) of nodes and then wait for a signal from a device, over which time these clocks may drift relative to one another, the system can execute the method S100 to retroactively time-synchronize internal clocks within a set of nodes immediately after (e.g., within 100 milliseconds of) receipt of a wireless signal from a device (e.g., a target, known, and/or tracked smartphone or active asset tag) and then derive a three-dimensional position of the device relative to these nodes based on current time biases between internal clocks in these nodes.

Accordingly, the system can: retroactively and opportunistically time-synchronize nodes after receipt of a signal from a target or tracked device (or in response to a different trigger); reduce or eliminate clock drift (e.g., by drastically shortening the time during which clock drift can occur) between clock synchronization within the population of nodes and receipt of a signal from the target or tracked device; and thus localize the device with very high spatial resolution, accuracy, and repeatability.

2.1 Synchronization

In particular, the system can synchronize (e.g., derive clock offsets or "time biases") the nodes immediately after receipt of a wireless signal from the target device by broadcasting a multicast synchronization signal from a master node, recording arrival times of the multicast synchronization signal at sniffer nodes, and deriving clock offsets between the clocks of the master node and the sniffer nodes based on transmit time of the multicast synchronization signal, receive times of the multicast synchronization signal and the wireless signal at the sniffer nodes, and a channel state measured prior to receiving the wireless signal.

For example, during a first time period (e.g., a time period in which the communication channel exhibits decreased traffic), the system can execute a two-way measurement of the channel state by: transmitting ranging signals between the first node and the second node; recording transmit and receive times of these ranging signals at these nodes; recording (e.g., measuring) a set (e.g., a pair) of partial channel state information-characterizing a communication channel between these nodes-based on these ranging signals; computing a channel response of the communication channel based on the set of partial channel state information and the transmit and receive times of the ranging signals; and storing the channel response for access during synchronization.

Then, during a second time period, the system can synchronize the first node and the second node based on a synchronization signal—broadcast from the first node in response to receiving a localization signal from a target device—by: recording a partial channel state information based on the synchronization signal; and calculating a clock offset between the first node and the second node based on the partial channel state information and the channel response calculated during the first time period.

Therefore, by calculating the clock offset based on the channel response—pre-calculated during the first time period and accessed during the second time period—and the partial channel state information based on the synchronization signal, the system can bypass execution of the two-way channel state measurement procedure responsive to receiving the localization signal from the target device in order to synchronize the first node and the second node, thereby reducing latency and avoiding computation and/or communication overhead attributed to the two-way channel state measurement procedure.

2.2 Variation: Alternative Signals

As described herein, the system executes the method S100: to broadcast a synchronization signal from a master node in response to receiving a localization signal from a target device; to receive the synchronization signal at a sniffer node; to access a channel response of a communication channel between the master node and the sniffer node; to record a partial channel state information based on the synchronization signal; and to calculate a clock phase offset between the master node and the sniffer node based on the partial channel state information and the channel response in order to synchronize the master node and the sniffer node.

However, the system can similarly execute Blocks of the method S100 to synchronize a first node and a second node based on signals other than a localization signal transmitted by a target device and a synchronization signal transmitted by the first node in response to receiving the localization signal, such as a data signal and an acknowledgement signal responsive to the data signal.

Accordingly, rather than synchronizing a first node and a second node based on a synchronization signal transmitted by the first node in response to receiving a localization signal from a target device, the system can execute Blocks of the method S100 to synchronize these nodes based on a data signal and an acknowledgement signal-transmitted between the first node and the target device-intercepted by the second node. Therefore, the system can synchronize the first node and the second node absent the synchronization signal, thereby enabling the first node to bypass transmitting the synchronization signal in order to reduce communication overhead.

3. Terminology

Generally, a "master node" is referred to herein as a node configured to broadcast a synchronization signal to other nodes (e.g., sniffer nodes), such as in response to receiving (e.g., intercepting) a localization signal transmitted from a target device.

Generally, a "sniffer node" is referred to herein as a node configured to synchronize with a master node in response to receiving a synchronization signal from a master node.

Generally, a "localization signal" is referred to herein as a signal-transmitted from a target device to a node-based on which the system localizes the target device within a space (e.g., a two-dimensional space, a three-dimensional space).

Generally, a "synchronization signal" is referred to herein as a multicast signal-broadcast by a master node-based on which the system synchronizes a sniffer node with the master node.

Generally, an "acknowledgement signal" is referred to herein as a signal-transmitted by a target device-representing receipt of message (e.g., a data signal) from a node.

Generally, "partial channel state information" is referred to herein as the complex vector used to transform multicarrier modulated symbols back to the originally transmitted form.

4. System

Figure 3:
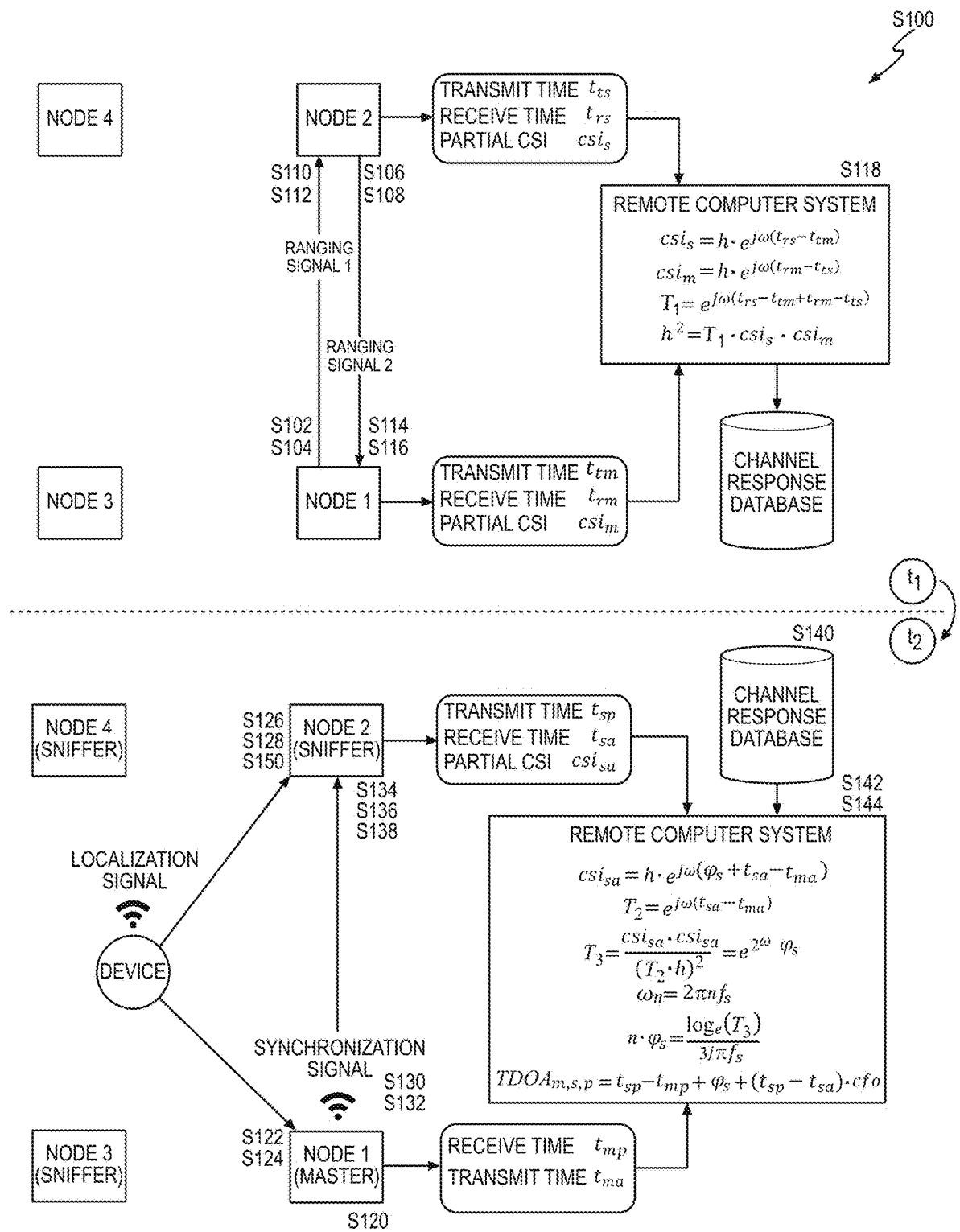
FIG. 3 is a flowchart representation of one variation of the method.

Generally, as shown in FIGS. 1 and 3, the system can include or interface with: a set of nodes (e.g., transceivers, Wi-Fi access points); a set of devices (e.g., Wi-Fi enabled devices); and a remote computer system (e.g., a controller, a remote server).

In one implementation, the set of devices includes a target device configured to communicate with a node and arranged at a target (unknown) position in a space.

In one example, the target device includes a mobile phone carried by a healthcare worker in a hospital.

In another example, the target device includes an asset tag coupled to a medical device tracked within the hospital.

In another implementation, the system includes the set of nodes arranged at a set of known positions in the space.

In one example, the set of nodes includes a subset of sniffer nodes configured to receive (e.g., intercept) signals (e.g., localization signals, data signals, acknowledgement signals) transmitted from the target device.

In another example, the set of nodes includes a master node configured: to intercept signals transmitted from the target device; and to transmit (e.g., broadcast) a signal (e.g., a synchronization signal, a data signal).

In one implementation, the target device transmits (e.g., broadcasts) a localization signal.

For each node in the set of nodes, the node: receives the localization signal at the node; records a receive time of the localization signal at the node; and transmits the receive time of the localization signal at the node to the remote computer system.

In another implementation, the master node transmits a synchronization signal in response to receiving the localization signal.

For each sniffer node in the subset of sniffer nodes, the sniffer node: receives the synchronization signal from the master node; records a set of time synchronization data-such as a receive time of the synchronization signal at the sniffer node and a partial channel state information-based on the synchronization signal; and transmits the set of time synchronization data to the remote computer system.

Then, for each sniffer node in the subset of sniffer nodes, the remote computer system: derives a time bias of the sniffer node relative to the master node based on the set of synchronization data; and calculates an adjusted receive time—in a set of adjusted receive times—of the localization signal at the sniffer node based on the time bias.

In this implementation, the remote computer system estimates a target position of the target device within the space based on the receive time of the first signal at the master node and the set of adjusted receive times of the localization signal at the subset of sniffer nodes.

In one variation, a sniffer node: derives the time bias relative to the master node based on the receive time of the synchronization signal and the set of time synchronization data; calculates the adjusted receive time—in the set of adjusted receive times—of the localization signal at the sniffer node based on the time bias; and transmits the adjusted receive time to the remote computer system.

In this variation, the remote computer system executes the foregoing methods and techniques to estimate the target position of the target device within the space based on the receive time of the localization signal at the master node and the set of adjusted receive times of the localization signal at the subset of sniffer nodes.

4.1 Node Positions and Distances

Generally, the system can identify (or detect) positions of the set of nodes.

In one implementation, the system: accesses a first set of position information specifying a first position of the first node; and identifies the first position of the first node based on the first set of position information.

In one example, the system accesses the first set of position information specifying a first set of coordinates, within the space, occupied by the first node based on survey measurements of the first node.

In another example, the system accesses the first set of position information specifying sets of coordinates, within the space, occupied by the first node at each time interval in a set of time intervals. In this example, the system identifies the first position of the first node based on the sets of coordinates (e.g., a centroid of the sets of coordinates).

The system repeats the foregoing methods and techniques for each node in the set of nodes: to access a set of position information specifying a position of the node; and to identify a position of the node based on the set of position information.

Therefore, for each pair of nodes in the set of nodes, the system can calculate (or derive) a distance between the pair of nodes based on positions of these nodes.

5. Two-Way Channel State Measurement

Generally, during a first time period (e.g., a channel state measurement period), for each pair of nodes in the set of nodes, the system can characterize a channel response (or a "full channel state") of the communication channel between the pair of nodes. For example, the system can measure the full channel state (execute "two-way channel state measurement") by transmitting two signals (e.g., ranging signals) between each unique pair of nodes in the set of nodes.

5.1 First Ranging Signal

The method S100 includes, at the first node: transmitting a first ranging signal to the second node in Block S102; and recording a second transmit time of the first ranging signal from the first node in Block S104.

The method S100 includes, at the second node: in response to receiving the first ranging signal, recording a fourth receive time of the first ranging signal at the second node in Block S110; and, based on the first ranging signal, recording a second partial channel state information characterizing the communication channel in Block S112.

In one implementation, the first node: transmits a first ranging signal to the second node in Block S102; and records a first transmit time of the first ranging signal from the first node in Block S104.

In this implementation, the second node: receives the first ranging signal; records a first receive time of the first ranging signal at the second node in Block S110; and records a first partial channel state information based on the first ranging signal in Block S112. The first state information: characterizes a first communication channel between the first node and the second node; and represents a response of the communication channel in the frequency domain.

Therefore, the system can measure the first partial channel state information of the communication channel, the first partial channel state information representing an impulse response of the communication channel in frequency domain. Measuring the first partial channel state information enables the system to derive a full channel response of the communication channel representing attenuation, delay, and signal propagation times associated with channel. The system can later implement the full channel response to synchronize clocks within the master node and the sniffer node.

5.2 Second Ranging Signal

The method S100 includes, at the second node: transmitting a second ranging signal to the first node in Block S106; and recording a third transmit time of the second ranging signal from the second node in Block S108.

The method S100 includes, at the first node: in response to receiving the second ranging signal, recording a fifth receive time of the second ranging signal at the first node in Block S114; and, based on the second ranging signal, recording a third partial channel state information characterizing the communication channel in Block S116.

In another implementation, the second node: transmits a second ranging signal to the first node in Block S106; and records a second transmit time of the second ranging signal from the second node in Block S108.

In this implementation, the first node: receives the second ranging signal; records a second receive time of the second ranging signal at the first node in Block S114; and records a second partial channel state information based on the second ranging signal in Block S116.

Therefore, based on the first partial channel state information, the second partial channel state information, and the transmit and receive times of the first ranging signal and the second ranging signal, the system can derive a full channel response of the communication channel, the full channel response representing characteristics of the channel such as attenuation, delay, and signal propagation time.

5.3 Channel Response

Block S118 of the method S100 recites calculating the first channel response based on: the second partial channel state information; the third partial channel state information; the second transmit time of the first ranging signal; the third transmit time of the second ranging signal; the fourth receive time of the first ranging signal; and the fifth receive time of the second ranging signal.

In one implementation, the first node transmits, to the remote computer system: the first transmit time of the first ranging signal; the second receive time of the second ranging signal at the first node; and the second partial channel state information.

In this implementation, the second node transmits, to the remote computer system: the second transmit time of the second ranging signal; the first receive time of the first ranging signal at the second node; and the first partial channel state information.

In Block S118, the remote computer system calculates a first channel response of the first communication channel between the first node and the second node based on: the first partial channel state information; the second partial channel state information; the first transmit time of the first ranging signal; the second transmit time of the second ranging signal; the first receive time of the first ranging signal; and the second receive time of the second ranging signal.

For example, the remote computer system can calculate the first channel response h based on: the first transmit time $t_{tm}$ of the first ranging signal; the second transmit time $t_{ts}$ of the second ranging signal; the first receive time $t_{rs}$ of the first ranging signal; the second receive time $t_{rm}$ of the second ranging signal; the first partial channel state information $csi_s$; and the second partial channel state information $csi_m$, wherein:

$$csi_s = h \cdot e^{j\omega(t_{rs}-t_{tm})}$$

$$csi_m = h \cdot e^{j\omega(t_{rm}-t_{ts})}$$

$$T_1 = e^{j\omega(t_{rs}-t_{tm}-t_{rm}-t_{ts})}$$

$$h^2 = T_1 \cdot csi_s \cdot csi_m = csi_s \cdot csi_m \cdot e^{j\omega(t_{rs}-t_{tm}-t_{rm}-t_{ts})}$$

In this example, the remote computer system can characterize the first channel response based on a square of the first channel response (e.g., $h^2$) in order to bypass a square root function that exhibits ambiguity for complex vectors.

Therefore, based on two-way channel state measurement, the system derives the first channel response representing characteristics of the first communication channel, such as attenuation, delay, and signal propagation time.

The system repeats the foregoing methods and techniques for each pair of nodes in the set of nodes to calculate (and store) a channel response of a communication channel between the pair of nodes.

5.3 Two-Way Channel State Measurement Trigger

In one implementation, the system executes Blocks of the method S100 to characterize (or update) the channel response of the communication channel in response to detecting a change in the communication channel.

For example, the first node can: at a first time, detect a first signal from the target device characterized by first partial channel state information exhibiting a first shape; and, at a second time, detect a second signal from the target device characterized by second partial channel state information exhibiting a second shape. In response to a difference between the second shape and the first shape exceeding a threshold shape difference, the master node can transmit a third ranging signal to the second node in order to initiate two-way channel state measurement.

Therefore, in response to detecting a change in the communication channel, such as moving objects or people between or proximal the nodes, the system can trigger two-way channel state measurement to update the full channel response.

In another implementation, the system executes Blocks of the method S100 to characterize (or update) the channel response of the communication channel according to a configuration signal.

For example, the first node can receive a configuration signal indicating a transmission time (or transmission schedule) for the first ranging signal. In this example, the first node can receive the configuration signal instructing the first node to initiate the two-way channel state measurement at 4:00 AM every weekday.

Additionally or alternatively, the first node can receive a configuration signal indicating a trigger condition for transmission of the ranging signal.

In one example, the first node receives the configuration signal instructing the first node to initiate the two-way channel state measurement in response to detecting a change in the communication channel.

In another example, the first node receives an updated transmission schedule responsive to a change in the communication channel. More specifically, the first node can receive a second transmission schedule-specifying a second transmission interval (e.g., once every twelve hours) falling below a first transmission interval (e.g., once every 24 hours) specified in a first transmission schedule-responsive to a change in the communication network.

Therefore, the system can configure the first node to initiate two-way channel state measurement at a predefined time(s) and/or (adaptively) in response to a particular trigger event.

5.4 Variation: Nodes at Known Distance

The method S100 includes: in response to receiving a third signal from the first node, recording a fourth receive time of the third signal at the second node in Block S110; based on the third signal, recording a second partial channel state information characterizing the communication channel in Block S112; and calculating the first channel response based on the second partial channel state information and a first distance between the first node and the second node in Block S118.

Figure 4:
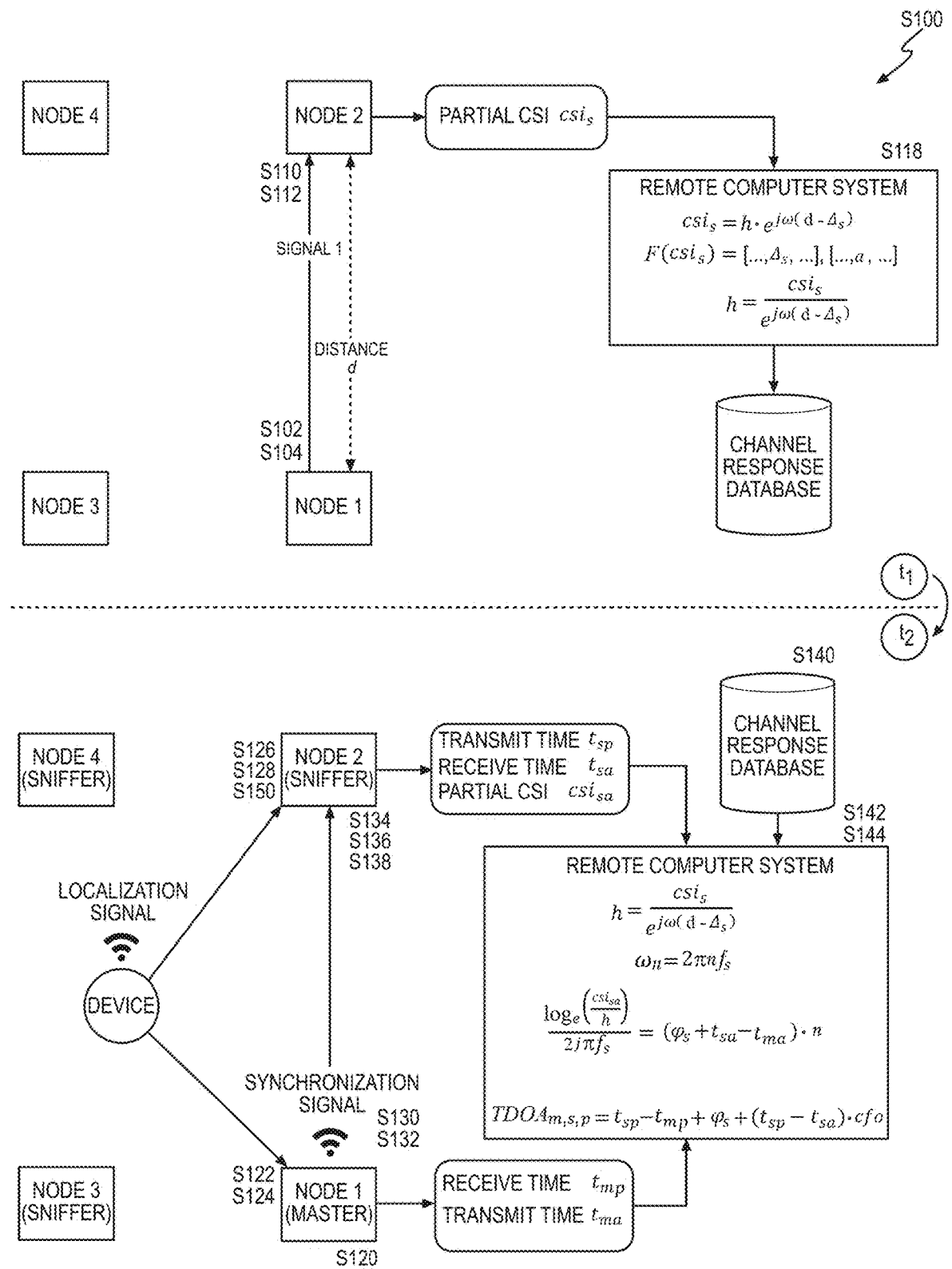
FIG. 4 is a flowchart representation of one variation of the method.
Figure 5:
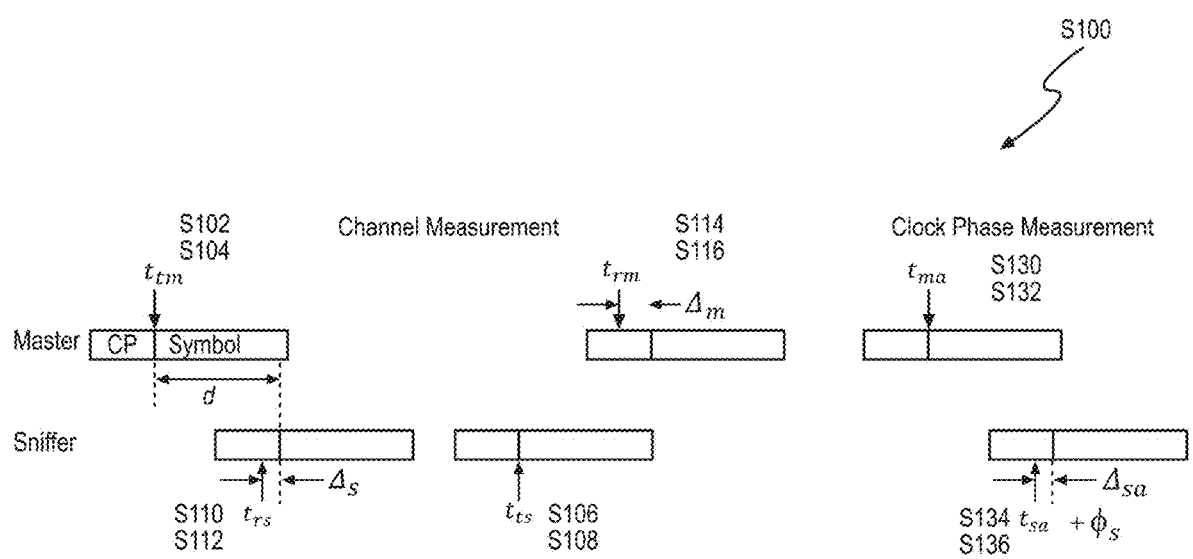
FIG. 5 is a flowchart representation of one variation of the method.
Figure 6:
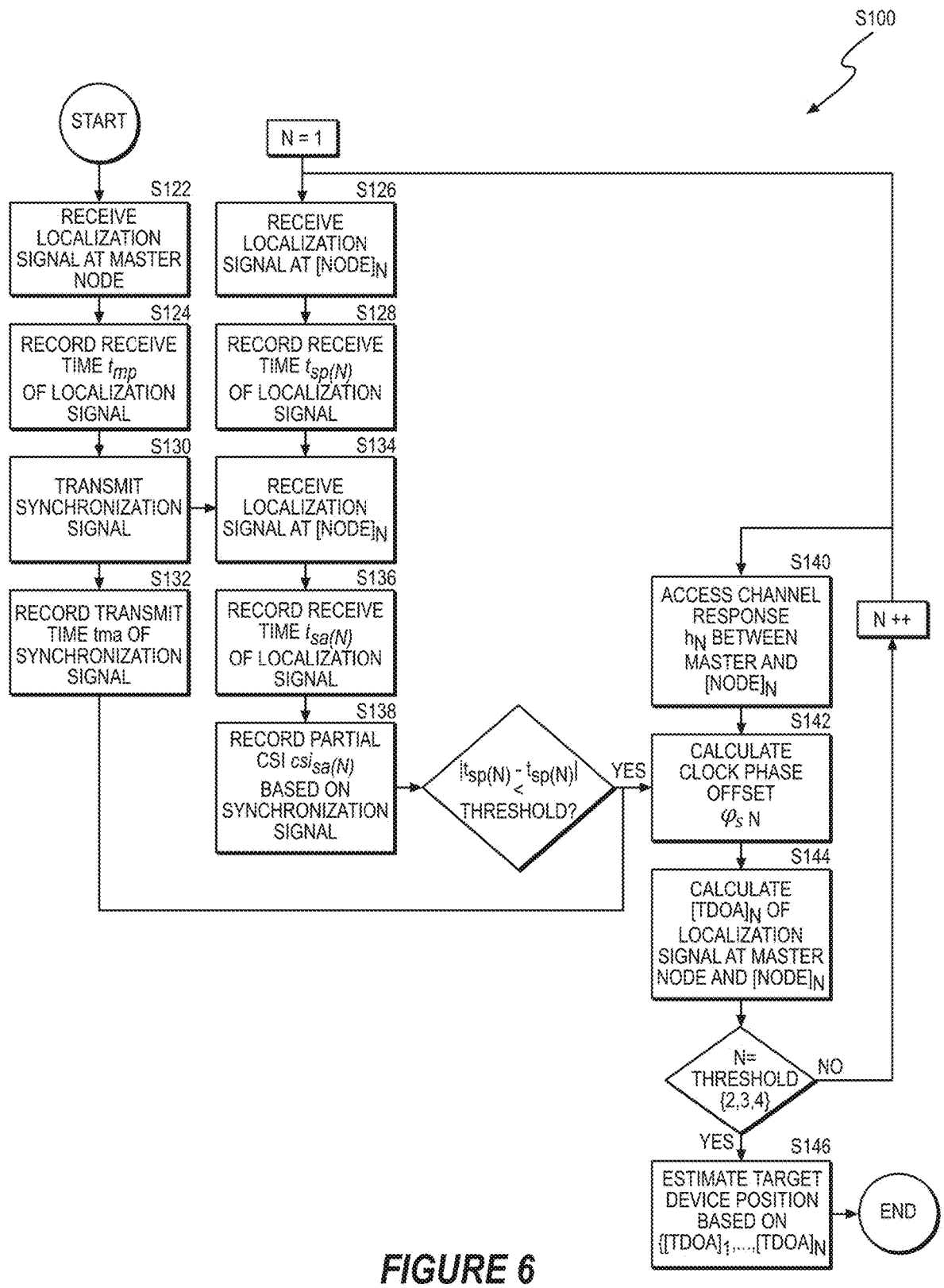
FIG. 6 is a flowchart representation of one variation of the method.

In one variation, as shown in FIG. 4, the system characterizes a channel response of a communication channel between a first node and a second node based on a signal from the first node.

More specifically, in response to receiving the signal from the first node, the second node: records a receive time of the signal at the second node in Block S110; and records a partial channel state information based on the signal in Block S112. The second node transmits the receive time of the signal and the partial channel state information to the remote computer system.

In this variation, the remote computer system: accesses a first distance between the first node and the second node; and calculates the channel response based on the partial channel state information and a first distance between the first node and the second node in Block S118s.

For example, the remote computer system can: receive the partial state information $csi_{sa}$; and access the first distance d, wherein:

$$csi_s = h \cdot e^{j\omega(d-\Delta_s)}$$

In this example, the remote computer system can: convert the partial channel state information into a set of delays and a set of amplitudes—for a set of components of the signal—based on a function (e.g., Matrix Pencil, MUSIC); and calculates the channel response h. The earliest amplitude a, in the set of amplitudes, exceeding a noise floor exhibits a delay value $\Delta_s$, wherein:

$$F(csi_s) = [..., \Delta_s, ...], [..., a, ...]$$

$$h = \frac{csi_s}{e^{j\omega(d-\Delta_s)}}$$

Therefore, rather than calculating a channel response of the communication channel between a pair of nodes based on two-way measurement of ranging signals between these nodes, the system can derive the channel response based on one signal transmitted from one node in the pair of nodes, thereby enabling the system to reduce communication overhead and characterize the communication channel during periods of increased (e.g., heavy) communication traffic.

The system repeats the foregoing methods and techniques for each pair of nodes in the set of nodes to calculate (and store) a channel response of a communication channel between the pair of nodes based on one signal transmitted from one node in the pair of nodes.

The system can execute similar methods and techniques as described above to calculate (or update) a channel response of the communication channel between a pair of nodes based on one signal transmitted from one node in the pair of nodes according to a predefined time(s) and/or (adaptively) in response to a particular trigger event.

6. One-Way Multicast Synchronization

Generally, a first node (e.g., a "master node") can broadcast a second signal (e.g., a multicast synchronization signal) based on which a second node (e.g., a "sniffer node") can synchronize with the first node. The second node can: receive the second signal from the first node; record a receive time of the signal at the second node; and record a partial channel state information based on the signal. The system can: estimate a phase difference between a first timing reference (e.g., a first clock characterized by a first clock frequency) at the first node and a second timing reference (e.g., a second clock characterized by a second clock frequency) at the second node based on the receive time of the signal at the second node and the partial channel state information; and synchronize the first node and the second node (e.g., synchronize the first timing reference and the second timing reference) based on the phase difference.

For example, the first node can broadcast a synchronization signal in response to intercepting a first signal (e.g., a localization signal) transmitted by a target device.

Accordingly, by broadcasting the synchronization signal in response to intercepting the localization signal transmitted by the target device, the system triggers synchronization of a set of nodes-including the first node and the second node-tracking the target device.

Therefore, rather than consuming bandwidth to iteratively time-synchronize internal clocks of the first node and the second node (e.g., once per second, once per minute, once per hour) and then wait for a signal (e.g., the localization signal) from the target device, over which time these clocks may drift relative to one another, the system can synchronize the first node and the second node in response to intercepting the localization signal in order to reduce a time difference between the synchronization signal and the localization signal, reduce or eliminate clock drift between the first node and the second nodes, and localize the target device with high spatial accuracy.

6.1 Intercepting the Localization Signal at Master Node

The method S100 includes, at a first node: receiving a first signal transmitted from a target device in Block S122; recording a first receive time of the first signal at the first node in Block S124; transmitting a second signal from the first node in Block S130; and recording a transmit time of the second signal from the first node in Block S132.

In one implementation, the master node: receives a localization signal transmitted from a target device in Block S122; and records a first receive time of the localization signal at the master node in Block S124. Additionally, the master can transmit the first receive time of the localization signal to the remote computer system.

In response to receiving the localization signal, the master node: transmits (e.g., broadcasts) a synchronization signal (e.g., a multicast synchronization signal) in Block S130; and records a transmit time of the synchronization signal from the first node in Block S132. Additionally, the master can transmit the transmit time of the synchronization signal to the remote computer system.

In another implementation, the master node broadcasts a series of multicast synchronization signals in response to receiving the first signal from the target device.

For example, the master node can broadcast a series of multicast synchronization signals at a set of times (e.g., randomized times) in response to receiving the first signal.

Therefore, by broadcasting the series of multicast synchronization signals at a set of randomized times, the master node can increase likelihood of assignment of at least one multicast synchronization signal in the series of multicast synchronization signals to a transit window in the communication channel during a period of increased (or "heavy") communication traffic.

6.1.1 Localization Signal Filtering

In one implementation, in response to receiving the localization signal from the target device, the master node detects an identifier in the localization signal.

For example, the master node can detect a first identifier (e.g., a first MAC address of the target device) associated with the target device in the localization signal.

In this implementation, the master node broadcasts the synchronization signal in response to identifying the first identifier in a list of identifiers (e.g., a list of MAC addresses of a set of target devices).

Therefore, rather than broadcasting a synchronization signal in response to receiving any signal at the master node, the master node can: verify that the localization signal is transmitted by the target device included in the set of target devices (e.g., a set of target devices tracked by the set of nodes); and broadcast the synchronization signal in response to verifying that the localization signal is transmitted by the target device included in the set of target devices, thereby minimizing communication overhead attributed to synchronization of the set of nodes.

In another implementation, in response yo identifying the first identifier in the list of identifiers, the master node: records the first receive time of the localization signal at the master node; and transmits the first receive time of the localization signal to the remote computer system.

6.1.2 Master Node Selection

Block S120 of the method S100 recites selecting the first node as a master node based on a first position of first node relative to the set of devices.

Generally, in Block S120, the system (e.g., the remote computer system) can select a target node in the set of nodes as a master node that broadcasts a synchronization signal to other nodes in the set of nodes, such as in response to receiving a localization signal transmitted from a target device.

In one implementation, for each pair of nodes in the set of nodes, the system can execute the foregoing methods and techniques to calculate (and store) a channel response of a communication channel between the pair of nodes. Accordingly, the system can calculate a set of channel responses—of a set of communication channels-between pairs of nodes.

More specifically, based on the first channel response of the first communication channel between the first node and the second node, the remote computer system can characterize a first link quality (e.g., communication quality)—in a first subset of link qualities—of the first communication channel.

For each other node in the set of nodes, the system can repeat the foregoing methods and techniques to characterize a link quality—in the first subset of link qualities and of a communication channel between the first node and the node—based on a channel response of the communication channel.

The system can repeat the foregoing methods and techniques for each node in the set of nodes to characterize a subset of link qualities—in a set of link qualities—of communication channels between the node and other nodes in the set of nodes based on channel responses of these communication channels.

In another implementation, the system: identifies a target node in the set of nodes exhibiting highest link quality; and selects the target node as a master node.

For example, the remote computer system can: identify the first subset of link qualities exhibiting highest link quality (e.g., highest average link quality) in the set of link qualities (e.g., among subsets of link qualities in the set of link qualities); and select the first node-corresponding to the first subset of link qualities—as the master node in response to identifying the first subset of link qualities exhibiting highest link quality.

Additionally or alternatively, the system can select a target node as the master node based on a target position of target node relative to the set of nodes.

For example, the system can select the first node as the master node based on a first position of the first node in (or proximal) a geographic center of the set of nodes.

In response to selection as the master node, the first node executes the foregoing methods and techniques to transmit a synchronization signal in response to receiving a localization signal from a target device.

6.2 Intercepting Localization Signal at Sniffer Node

The method S100 includes, at the second node: receiving the first signal transmitted from the target device in Block S126; and recording a second receive time of the first signal at the second node in Block S128.

In one implementation, the sniffer node executes the foregoing methods and techniques: to receive the localization signal transmitted from the target device in Block S126; and to record a second receive time of the localization signal at the sniffer node in Block S128. Additionally, the sniffer node can transmit the second receive time of the localization signal to the remote computer system.

In another implementation, the sniffer node executes the foregoing methods and techniques, in response to identifying the first identifier in the list of identifiers: to record the second receive time of the localization signal at the sniffer node; and to transmit the second receive time of the localization signal to the remote computer system.

6.3 Receiving Multicast Synchronization Signal at Sniffer Node

The method S100 includes, at the second node: receiving the second signal transmitted from the first node in Block S134; recording a third receive time of the second signal at the second node in Block S136; and, based on the second signal, recording a first partial channel state information characterizing a communication channel between the first node and the second node for a second time period in Block S138.

In one implementation, the sniffer node: receives the synchronization signal in Block S134; and records a third receive time of the synchronization signal at the second node in Block S136.

In another implementation, based on the synchronization signal, the sniffer node records a third partial channel state information characterizing a communication channel between the master node and the sniffer node in Block S138. Additionally, the sniffer node can transmit the third receive time of the synchronization signal and/or the third partial channel state information to the remote computer system.

6.4 Estimating Time Bias at the Remote Computer System

Block S140 of the method S100 recites accessing a first channel response characterizing the communication channel between the first node and the second node for a first time period preceding the second time period.

Block S142 of the method S100 recites, in response to the first signal, calculating a time bias between the first node and the second node based on: the transmit time of the second signal from the first node; the third receive time of the second signal at the second node; the first channel response; and the first partial channel state information.

Generally, in Blocks S140 and S142, during a second time period (e.g., a synchronization period) succeeding the first time period (e.g., the measurement period), the system can: access a first channel response-pre-calculated during the first time period-characterizing the communication channel between the first node (e.g., the master node) and the second node (e.g., the sniffer node) for the first time period; and calculate a time bias, including a clock phase difference, between the first node and the second node based on the transmit time of the second signal from the first node, the third receive time of the second signal at the second node, the first channel response, and/or the third partial channel state information characterizing the communication channel between the first node and the second node for the second time period.

In one implementation, the remote computer system receives—from the master node—the transmit time of the synchronization signal. Additionally, the remote computer system can receive, from the sniffer node: the third receive time of the synchronization signal; and the third partial channel state information associated with the synchronization signal.

In this implementation, in Block S140, the remote computer system accesses a first channel response characterizing the communication channel between the master node and the sniffer node for the first time period.

In another implementation, in Block S142, the remote computer system calculates a time bias-including a clock phase difference-between the master node and the sniffer node based on: the transmit time of the synchronization signal from the master node; the third receive time of the synchronization signal at the sniffer node; the first channel response; and the third partial channel state information.

In one example, as shown in FIG. 1, the remote computer system calculates the clock phase difference based on: the transmit time of the synchronization signal from the master node; the third receive time of the synchronization signal at the sniffer node; and a quotient of the first partial channel state information and the first channel response.

More specifically, the remote computer system can: calculate a first square of the first partial channel state information $csi_{sa}$; and calculate a second square of the first channel response $csi_{sa}$. Then, the remote computer system can calculate the clock phase difference $\sigma_s$ based on: the transmit time $t_{ma}$ of the second signal from the first node; the third receive time $t_{sa}$ of the second signal at the second node; and a quotient of the first square of the first partial channel state information $csi_{sa}$ and the second square of the first channel response h., wherein:

$$csi_{sa} = h \cdot e^{j\omega(\varphi_s + t_{sa} - t_{ma})}$$

$$T_2 = e^{j\omega(t_{sa} - t_{ma})}$$

$$T_3 = \frac{csi_{sa} \cdot csi_{sa}}{(T_2 \cdot h)^2} = e^{2j\omega\varphi_s}$$

In this example, the remote computer system can calculate the clock phase difference $\varphi_s$ based on a subcarrier n, wherein:

$$\omega_n = 2\pi n f_s$$

$$n \cdot \varphi_s = \frac{\log_e(T_3)}{4j\pi f_s}$$

In another example, the remote computer system calculates the clock phase difference based on: the transmit time of the synchronization signal from the master node; the third receive time of the synchronization signal at the sniffer node; and a slope of the quotient of the third partial channel state information and the first channel response.

In another example, as shown in FIG. 2, the remote computer system calculates the clock phase difference $\varphi_s$ between the master node and the sniffer node based on: the transmit time of the synchronization signal from the master node; the third receive time of the synchronization signal at the sniffer node; the first channel response h; the third partial channel state information $csi_{sa}$; the first distance between the master node and the sniffer node d; and the subcarrier n, wherein: φ

$$h = \frac{csi_s}{e^{j\omega(d - \Delta_s)}}$$

$$\omega_n = 2\pi n f_s$$

$$\frac{\log_e\left(\frac{csi_{sa}}{h}\right)}{2j\pi f_s} = (\varphi_s + t_{sa} - t_{ma}) \cdot n$$

Therefore, by calculating the clock phase difference based on the first channel response—pre-calculated during the first time period and accessed during the second time period— and the third partial channel state information characterizing the communication channel between the first node and the second node for the second time period, the system can bypass execution of the two-way channel state measurement procedure responsive to receiving the localization signal from the target device in order to synchronize the master node and the sniffer node, thereby reducing latency and avoiding computation and/or communication overhead attributed to the two-way channel state measurement procedure.

In another implementation, in response to calculating the clock phase difference between the master node and the sniffer node, the remote computer system estimates a receive time of the localization signal at the sniffer node according to the first timing reference of the master node based on the clock phase difference, the second receive time of the localization signal at the second node, and the third receive time of the synchronization signal at the second node.

6.4.1 Relative Time

In one implementation, in response to calculating the time bias between the master node and the sniffer node, the remote computer system calculates a fourth receive time of the localization signal at the sniffer node—relative to the first timing reference of the master node—based on: the second receive time of the localization signal at the sniffer node; the third receive time of the synchronization signal at the sniffer node; the clock phase difference; and a clock frequency offset between the first timing reference of the master node and the second timing reference of the sniffer node.

For example, the remote computer system can: access the first clock frequency of the first timing reference; access the second clock frequency (e.g., the second clock frequency different from the first clock frequency) of the second timing reference; and calculate a clock frequency offset cfo based on a difference between the first clock frequency and the second clock frequency.

In this example, the system can estimate the fourth receive time $t_{sp,m}$ of the localization signal at the sniffer node-relative to the first timing reference of the master node-based on: the second receive time $t_{sp}$ of the localization signal at the sniffer node; the third receive time $t_{sa}$ of the synchronization signal at the sniffer node; the clock phase offset $\varphi_s$; and the clock frequency offset cfo, wherein:

$$t_{sp,m} = t_{sp} + \varphi_s + (t_{sp} - t_{sa}) \cdot cfo$$

6.4.2 Time Proximity of Localization and Synchronization Signals

In one variation, in Block S142, the remote computer system: calculates a first duration between the second receive time, of the localization signal at the sniffer node, and the third receive time of the synchronization signal at the sniffer node; and calculates the time bias in response to the first duration falling below a threshold duration (e.g., one millisecond, five hundred nanoseconds).

Alternatively, in response to the first duration exceeding the threshold duration, the remote computer system can bypass calculating the time bias.

Therefore, by calculating the time bias in response to the first duration between receive times—of the localization and synchronization signals at the sniffer node—falling below the threshold duration (and bypassing calculating the time bias in response to the first duration between these receive times exceeding the threshold duration), the system ensure accuracy of time bias estimation, thereby improving accuracy of arrival time and/or position estimation based on this time bias estimation by reducing or eliminating clock drift between the master node and the sniffer node.

6.4.3 Distance

In another variation, in Block S142, the remote computer system: accesses a first distance between the master node and the sniffer node; and calculates the time bias between the master node and the sniffer node based on the first distance.

More specifically, the remote computer system can calculate the time bias based on: the transmit time of the synchronization signal from the master node; the third receive time of the synchronization signal at the sniffer node; the first channel response; the third partial channel state information; and the first distance between the master node and the sniffer node.

Therefore, by calculating the time bias based on a known distance between the master node and the sniffer node, the system can further improve accuracy of time bias estimation.

6.4.4 Estimating the Time Bias at the Sniffer Node

In another variation, during the first time period, the system executes the foregoing methods and techniques: to characterize the first channel response of the communication channel between the master node and the sniffer node; and to store the first channel response for access during the second time period in order to calculate the clock offset difference.

In this variation, the system: stores the first channel response at the sniffer node during a time period (e.g., the first time period, a third time period) preceding the second time period; and accesses the first channel response at the sniffer node. Then, the sniffer node executes the foregoing methods and techniques to calculate the time bias at the sniffer node.

For example, in response to accessing the first channel response, the sniffer can: calculate the quotient of the third partial channel state information and the first channel response; and calculate the clock phase difference based on a slope of the quotient of the first partial channel state information and the first channel response.

The sniffer node transmits the time bias-including the clock phase difference—to the remote computer system.

Additionally, the sniffer can: calculate an adjusted receive time of the synchronization signal at the sniffer node based on the third receive time of the synchronization signal at the sniffer node and the time bias; and transmit the adjusted receive time of the synchronization signal to the remote computer system.

Therefore, the sniffer node can: access the first channel response pre-calculated during the first time period and stored on the sniffer node; record the third partial channel state information based on the synchronization signal received from the master node; calculate the time bias based on the third partial channel state information and the first channel response; and calculate the adjusted receive time of the synchronization signal based on the time bias in order to synchronize the second timing reference of the sniffer node with the first timing reference of the master node.

6.5 Synchronization Based on Alternative Signals

As described herein, the system executes the method S100: to broadcast a synchronization signal from a master node in response to receiving a localization signal from a target device; to receive the synchronization signal at a sniffer node; to access a channel response of a communication channel between the master node and the sniffer node; to record a partial channel state information based on the synchronization signal; and to calculate a clock phase offset between the master node and the sniffer node based on the partial channel state information and the channel response in order to synchronize the master node and the sniffer node.

However, the system can similarly execute Blocks of the method S100 to synchronize a first node and a second node based on signals other than a localization signal transmitted by a target device and a synchronization signal transmitted by the first node in response to receiving the localization signal.

In one variation, a first node (e.g., a "master node"): transmits a first signal (e.g., a data signal) to a target device; and records a transmit time of the first signal from the first node.

In this variation, a second node (e.g., a "sniffer node") executes the foregoing methods and techniques: to receive (e.g., intercept) the first signal transmitted from the first node; record a first receive time of the first signal at the second node; and to record a partial channel state information characterizing a communication channel between the first node and the second node for a second time period.

In response to receiving the first signal, the target device transmits a second signal. For example, the target device can transmit an acknowledgement signal responsive to a data signal—including an identifier (e.g., a MAC address, an association identifier, a sequence number) associated with the first node—from the first node.

In this variation, the first node executes the foregoing methods and techniques: to receive the second signal transmitted by the target device; and to record a second receive time of the second signal at the first node.

Additionally, the second node executes the foregoing methods and techniques: to receive the second signal transmitted from the target device; and record a third receive time of the second signal at the second node.

Then, the system executes the foregoing method and techniques to: access a channel response characterizing the communication channel between the first node and the second node for a first time period; and, in response to the second signal, calculate a time bias between the first node and the second node based on the transmit time of the first signal from the first node, the first receive time of the first signal at the second node, the partial channel state information, and the channel response.

More specifically, the system can execute the foregoing methods and techniques: to calculate a second duration between the first receive time, of the first signal at the second node, and the third receive time of the second signal at the sniffer node; and to calculate the time bias in response to the second duration falling below the threshold duration.

Accordingly, rather than synchronizing the first node and the second node based on a synchronization signal transmitted by the first node in response to receiving a localization signal from a target device, the system can synchronize the first node and the second node based on a data signal and an acknowledgement signal-transmitted between the first node and the target device-intercepted by the second node. Therefore, the system can synchronize the first node and the second node absent the synchronization signal, thereby enabling the first node to bypass transmitting the synchronization signal in order to reduce communication overhead.

7. Localization

Block S144 of the method S100 recites estimating a time-difference-of-arrival of the first signal at the first node and the second node based on: the first receive time of the first signal at the first node; the second receive time of the first signal at the second node; and the time bias.

Block S146 of the method S100 recites estimating a target position of the target device based on: the first receive time of the first signal at the first node; the second receive time of the first signal at the second node; and the time bias.

Generally, in Blocks S142 and S146, the system can: calculate a time bias between the master node and the sniffer node in response to a localization signal transmitted by the target device; and estimate a target position of the target device based on: the first receive time of the localization signal at the master node; the second receive time of the localization signal at the sniffer node; and the time bias.

In one implementation, in Block S142, the system (e.g., the remote computer system) calculates a first time-difference-of-arrival (hereinafter "TDOA") of the localization signal at the master node and the sniffer node based on: the first receive time of the localization signal at the master node; the second receive time of the localization signal at the sniffer node; the clock phase difference; and the clock frequency offset.

In one example, the system estimates the first TDOA based on: the first receive time $t_{mp}$ of the localization signal at the master node; the second receive time $t_{sp}$ of the localization signal at the sniffer node; the clock phase difference os; and the clock frequency offset cfo, wherein:

$$TDOA_{m,s,p} = t_{sp} - t_{mp} + \varphi_s + (t_{sp} - t_{sa}) \cdot cfo$$

The system repeats the foregoing methods and techniques for a third node (e.g., a second "sniffer node") in the set of nodes: to calculate a second clock phase difference between the master node and the third node; and to calculate a second TDOA of the localization signal at the master node and the third node based on: the first receive time of the localization signal at the master node; a fifth receive time of the localization signal at the sniffer node; the second clock phase difference; and a second clock frequency offset between the first timing reference of the master node and a third timing reference of the third node.

More specifically, the system can execute the foregoing methods and techniques: to receive the localization signal at the third node; record the fifth receive time of the localization signal at the third node; to record a sixth receive time of the synchronization signal at the third node; based on the synchronization signal, to record a fourth partial channel state information characterizing a second communication channel between the master node and the third node for the second time period; to access a second channel response characterizing the second communication channel between the master node and the third node for the first time period; to calculate a second clock phase difference between the master node and the third node based on the transmit time of the synchronization signal from the master node, the sixth receive time of the synchronization signal at the third node, the second channel response, and the fourth partial channel state information; and to estimate a second time-difference-of-arrival of the first signal at the first node and the third node based on the first receive time of the localization signal at the master node, the fifth receive time of the localization signal at the third node, the second clock phase difference, and the second clock frequency offset.

The system can repeat the foregoing methods, for each node in a subset of nodes: to calculate a clock phase difference between the master node and the node; and to calculate a TDOA—in a subset of time-differences-of-arrival (hereinafter "TDOAs")—of the localization signal at the master node and the node based on the clock phase difference.

In another implementation, in Block S146, the remote computer system computes a target position of the target device based on: the first TDOA of the localization signal at the master node and the sniffer node; and the second TDOA of the localization signal at the master node and the third node.

Additionally or alternatively, the remote computer system can compute the target position of the target device based on: the first TDOA of the localization signal at the master node and the sniffer node; and the subset of TDOAs of the localization signal at the master node and the subset of nodes.

Therefore, the system can estimate the target position of the target device by intercepting the localization signal at the master node (e.g., the first node) and a subset of nodes (e.g., including the second node and the third node) and synchronizing timing references of these nodes.

9. Combined Channel State Information

The method S100 includes: based on the set of signals, recording a set of partial channel state information characterizing a second communication channel between the second node and the target device in Block S150; calculating combined partial channel state information relative to the third signal based on the set of partial channel state information in Block S152; estimating a first time difference and a first phase difference for the first signal based on the combined partial channel state information in Block S154; and calculating an adjusted second receive time of the first signal based on the second receive time of the first signal at the second node, the first time difference, and first phase difference in Block S156.

Figure 7:
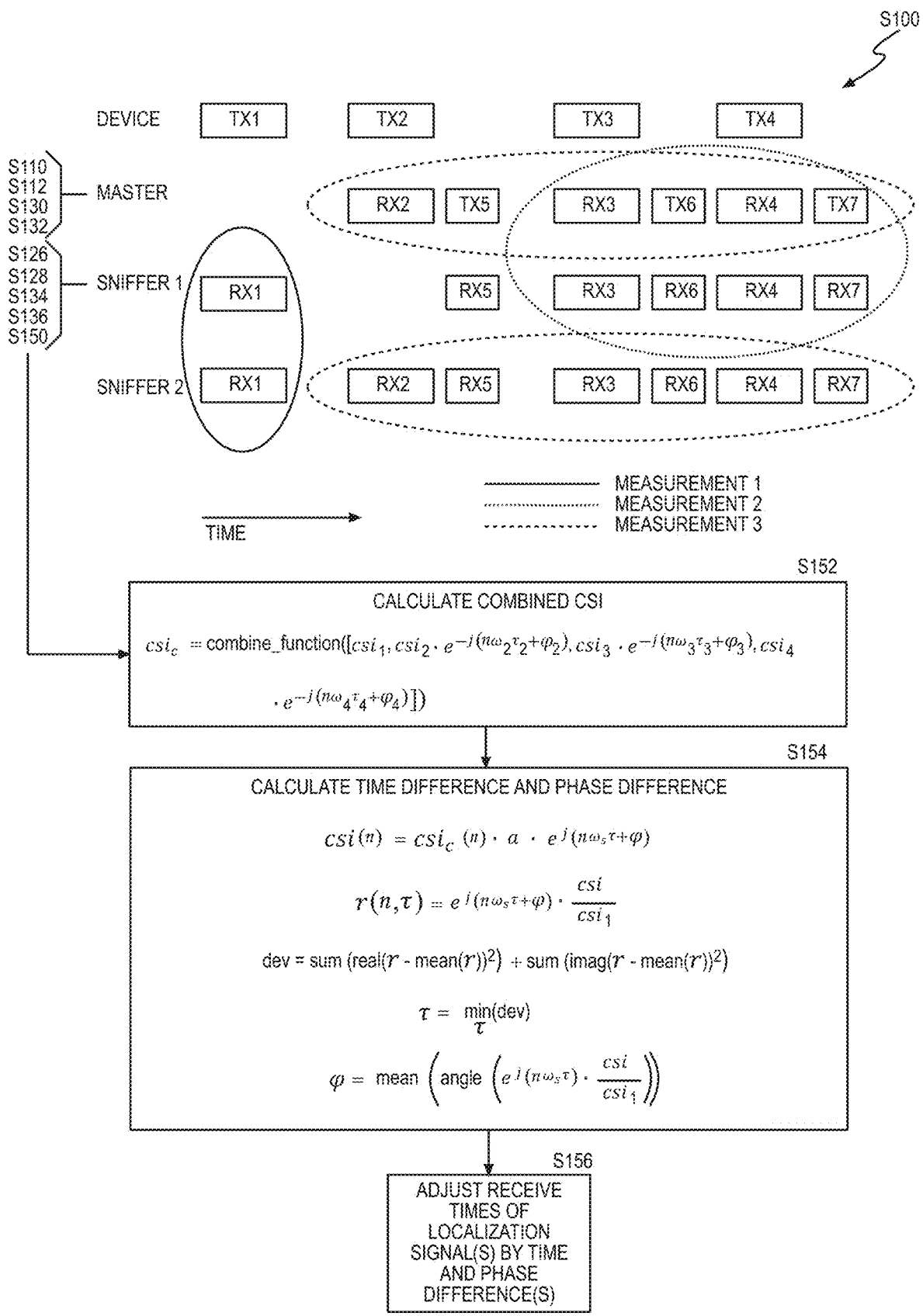
FIG. 7 is a flowchart representation of one variation of the method.

Generally, in Blocks S150, S152, S154, and S156 and as shown in FIG. 7, the system can characterize a channel response of a communication channel between a node and a target entity (e.g., a second node, a target device) based on a set of signals communicated between the node and the target entity.

More specifically, the system can: receive, at the node, a set of signals-including a first signal (e.g., a localization signal, a synchronization signal, a data signal, an acknowledgement signal) and a second signal—from the target entity; record a set of partial channel state information characterizing a communication channel between the node and the target entity; calculate combined partial state information relative to the first signal based on the set of partial channel state information; and calculate a time difference and a phase difference for the second signal based on the combination partial state information. The system then can calculate an adjusted receive time of the second signal at the node based on the time difference and the phase difference. Therefore, by adjusting the receive time of the first signal at the node based on the time difference and the phase difference, the system can improve arrival time estimation of the second signal at these nodes, thereby improving accuracy of position estimation for a target device.

9.1 Combining Channel State Information

In one implementation, the node: receives the set of signals including a first signal $p_1$, a second signal $p_2$, a third signal $p_3$, and a fourth signal $p_4$; and records the set of partial channel state information including first partial channel state information $csi_1$, second partial channel state information $csi_2$, third partial channel state information $csi_3$, and fourth partial channel state information $csi_4$ in Block S150.

Then, in Block S152, the system calculates the combined partial channel state $csi_c$ information—relative to the first signal—based on the set of partial channel state information, wherein:

$$csi_c = \text{combine\_function}\left(\left[csi_1, csi_2 \cdot e^{-j(n\omega_2 \tau_2 + \varphi_2)}, csi_3 \cdot e^{-j(n\omega_3 \tau_3 + \varphi_3)}, csi_4 \cdot e^{-j(n\omega_4 \tau_4 + \varphi_4)}\right]\right)$$

In one example, the system calculates the combined partial channel state based on a mean of the set of partial channel state information.

In another example, the system calculates the combined partial channel state based on a median of the set of partial channel state information.

In this implementation, the system converts the second signal $p_2$, the third signal $p_3$, and the fourth signal $p_4$ to the same time and phase moment relative to the first signal $p_1$, wherein: n defines a subcarrier index; $\tau_2$, $\tau_3$, and $\tau_4$ define a set of timing differences—of the second signal $p_2$, the third signal $p_3$, and the fourth signal $p_4$, respectively—relative to the first signal $p_1$; and $\varphi_2$, $\varphi_3$, and $\varphi_4$ define a set of phase differences of the second signal $p_2$, the third signal $p_3$, and the fourth signal $p_4$, respectively, relative to the first signal $p_1$.

9.2 Estimating Time and Phase Difference

In another implementation, in Block S154, the system calculates a time difference and a phase difference for a signal (e.g., the second signal) based on the combination partial state information.

More specifically, the system can define: partial channel state information csi—in the set of partial channel state information—for a signal in the set of signals; and a ratio $r(n, \tau)$, wherein:

$$csi(n) = csi_c(n) \cdot a \cdot e^{j(n\omega_s \tau + \varphi)}$$

$$r(n, \tau) = e^{j(n\omega_s \tau + \varphi)} \cdot \frac{csi}{csi_1}$$

In one example, the system calculates the time difference t based on minimization of a deviation dev of the ratio $r(n, \tau)$, wherein:

$$dev = \text{sum}\left(\text{real}(r - \text{median}(r))^2\right) + \text{sum}\left(\text{imag}(r - \text{median}(r))^2\right)$$

$$\tau = \min_\tau(dev)$$

In another example, the system calculates the time difference t based on minimization of a deviation dev of the ratio $r(n, \tau)$, wherein:

$$dev = \text{sum}\left(\text{real}(r - \text{mean}(r))^2\right) + \text{sum}\left(\text{imag}(r - \text{mean}(r))^2\right)$$

$$\tau = \min_\tau(dev)$$

In this implementation, the system calculates the phase difference $\varphi$ based on the time difference $\tau$, wherein:

$$\varphi = \text{mean}\left(\text{angle}\left(e^{j(n\omega_s \tau)} \cdot \frac{csi}{csi_1}\right)\right)$$

In another implementation, in Block S156, the system calculates an adjusted receive time of the signal based on a receive time of the signal at the node, the time difference, and the phase difference.

9.2.1 Subcarriers

In one variation, the system defines a subset of subcarriers (e.g., 100 subcarriers)—in a set of subcarriers—based on the deviation dev of the ratio $r(n, \tau)$.

For example, the system can: sort a set of deviation vectors (e.g., from least deviation to greatest deviation); and calculate the time difference t based on minimization of a subset of deviation vectors according to the subset of subcarriers, wherein:

$$\tau = \min_{\tau}(\text{sort}(dev)[0:100])$$

Therefore, by minimizing the subset of deviation vectors exhibiting least deviation, the system can reduce error attributed to fluctuations in channel state information in deep fading channels.

9.3 Combined Channel State Information: Sniffer Node and Target Device

In one example, the sniffer node executes the foregoing methods and techniques: to receive a first set of signals-including the localization signal and a second localization signal-transmitted from the target device; and to record a first set of receive times of the first set of signals at the sniffer node. The first set of receive times includes: the second receive time of the localization signal at the sniffer node; and a fourth receive time of the second localization signal at the sniffer node.

Based on the first set of signals, the sniffer node executes the foregoing methods and techniques to record a first set of partial channel state information characterizing a second communication channel between the second node and the target device.

In this example, the remote computer system: calculates combined partial channel state information-relative to the second localization signal-based on the first set of partial channel state information; estimates a first time difference and a first phase difference for the localization signal based on the combined partial channel state information; and calculates an adjusted second receive time of the localization signal based on the second receive time of the localization signal at the sniffer node, the first time difference, and the first phase difference.

Therefore, the system can estimate the first TDOA of the localization signal at the master node and the sniffer node based on: the first receive time of the localization signal at the master node; the adjusted second receive time of the localization signal at the sniffer node; and the clock phase difference between the master node and the sniffer node, thereby improving accuracy of position estimation for the target device.

9.4 Combined Channel State Information: Sniffer Node and Master Node

In another example, the sniffer node executes the foregoing methods and techniques: to receive a second set of signals-including the synchronization signal and a second synchronization signal-transmitted from the master node; and to record a second set of receive times of the second set of signals at the sniffer node. The second set of receive times includes: the third receive time of the synchronization signal at the sniffer node; and a fourth receive time of the second synchronization signal at the sniffer node.

Based on the second set of signals, the sniffer node executes the foregoing methods and techniques to record a second set of partial channel state information characterizing the first communication channel between the first node and the second node.

In this example, the remote computer system: calculates second combined partial channel state information-relative to the second synchronization signal-based on the second set of partial channel state information; estimates a second time difference and a second phase difference for the synchronization signal based on the second combined partial channel state information; and calculates an adjusted third receive time of the synchronization signal based on the third receive time of the synchronization signal at the sniffer node, the second time difference, and the second phase difference.

Therefore, the system can calculate the clock phase difference between the master node and the sniffer node based on: the transmit time of the synchronization signal from the master node; the adjusted third receive time of the synchronization signal at the sniffer node; the first channel response; and the third partial channel state information.

10. Localization Based on Measurement Groups

In one variation, the master node executes the foregoing methods and techniques: to receive a first subset of signals in a set of signals transmitted from the target device in Block S122, the first subset of signals including a first signal (e.g., a first localization signal, a first acknowledgement signal) and excluding a third signal (e.g., a second localization signal, a second acknowledgement signal); to record a first set of receive times of the first subset of signals at the master node in Block S126, the first set of receive times including a first receive time of the first signal at the master node; to transmit a second signal (e.g., a synchronization signal, a data signal) from the master node in Block S130; and to record a transmit time of the second signal from the master node in Block S132.

In this variation, the sniffer node executes the foregoing methods and techniques: to receive a second subset of signals in the set of signals transmitted from the target device in Block S126, the second subset of signals including the first signal and the third signal; to record a second set of receive times of the second subset of signals at the sniffer node in Block S128, the second set of receive times including a second receive time of the first signal at the sniffer node and a fourth receive time of the third signal at the sniffer node; to receive the second signal transmitted from the master node in Block S134; to record a third receive time of the second signal at the sniffer node in Block S136; and, based on the second signal, to record a first partial channel state information characterizing a communication channel between the first node and the second node for a second time period in Block S138.

In another variation, the system executes the foregoing methods and techniques: to access the first channel response characterizing the first communication channel between the master node and the sniffer node in Block S140; to calculate a clock phase difference between the master node and the sniffer node based on the transmit time of the second signal from the first node, the third receive time of the second signal at the second node, the first channel response, and the first partial channel state information in Block S142; and to estimate a first TDOA of the first signal at the first node and the second node based on the first set of receive times of the first subset of signals at the master node, the second set of receive times of the second subset of signals at the sniffer node, and the clock phase difference in Block S144.

In another variation, the system repeats the foregoing methods and techniques: to record a third set of receive times of a third subset of signals—in the set of signals and including the third signal—in response to receiving the third subset of signals at the third node, the third set of receive times including a fifth receive time of the third signal at the third node; to record a sixth receive time of the second signal at the third node in response to receiving the second signal at the third node; based on the second signal, to record a second partial channel state information characterizing a second communication channel between the first node and the third node for the second time period; to calculate a second clock phase difference between the first node and the third node based on the transmit time of the second signal from the first node, the sixth receive time of the second signal at the third node, a second channel response characterizing the second communication channel between the first node and the third node, and the second partial channel state information; and to estimate a second TDOA of the third signal at the second node and the third node based on the second set of receive times of the second subset of signals at the second node, the third set of receive times of the third subset of signals at the third node, the clock phase difference between the first node and the second node, and the second clock phase difference between the first node and the third node.

For example, the system can execute the foregoing methods and techniques to: calculate a second adjusted set of receive times—of the second subset of signals at the second node and relative to the first timing reference of the master node-based on the second set of receive times and the clock phase difference between the first node and the second node; and calculate a third adjusted set of receive times, of the third subset of signals at the third node and relative to the first timing reference of the master node, based on the third set of receive times and the second clock phase difference between the first node and the third node.

In another variation, in Block S146, the system executes similar methods and techniques as described above to estimate a target position of the target device based on: the first TDOA of the first signal at the first node and the second node; and the second TDOA of the third signal at the second node and the third node.

For example, the system can: generate a first trace in a space (e.g., a two-dimensional space) based on the first set of receive times of the first subset of signals at the master node, the second set of receive times of the second subset of signals at the sniffer node, the clock phase difference, and/or the first TDOA; generate a second trace in the space based on the second set of receive times of the second subset of signals at the second node, the third set of receive times of the third subset of signals at the third node, the clock phase difference between the first node and the second node, the second clock phase difference between the first node and the third node, and/or the second TDOA; and estimate the target position of the target device based on an intersection of the first trace and the second trace in the space.

The system can repeat the foregoing methods and techniques: to estimate a third TDOA of a fourth signal—in the set of signals—at the first node and the third node based on a third clock phase difference between the first node and the third node; to generate a third trace in the space based on the third TDOA; and to estimate the target position of the target device based on an intersection of the first trace, the second trace and the third trace in the space.

Therefore, the system can localize the target device based on subsets of signals in the set of signals transmitted by the target device-absent reception of each signal in the set of signals by each node in the set of nodes (e.g., due to positions of the target device and/or these nodes, due to unavailability of nodes to receive and/or process signals)—in order to increase resilience of the system.

11. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   selecting a first node as a master node based on a first position of the first node relative to a set of nodes;
   at the first node in the set of nodes:
      receiving a first signal transmitted from a target device;
      recording a first receive time of the first signal at the first node;
      transmitting a second signal from the first node in response to selecting the first node as the master node; and
      recording a transmit time of the second signal from the first node;
   at a second node in the set of nodes:
      receiving the first signal transmitted from the target device;
      recording a second receive time of the first signal at the second node;
      receiving the second signal transmitted from the first node;
      recording a third receive time of the second signal at the second node; and
      based on the second signal, recording a first partial channel state information characterizing a communication channel between the first node and the second node for a second time period;
   accessing a first channel response characterizing the communication channel between the first node and the second node for a first time period preceding the second time period;
   in response to the first signal, calculating a time bias between the first node and the second node based on:
      the transmit time of the second signal from the first node;
      the third receive time of the second signal at the second node;
      the first channel response; and
      the first partial channel state information; and
   estimating a target position of the target device based on:
      the first receive time of the first signal at the first node;
      the second receive time of the first signal at the second node; and
      the time bias.

2. The method of claim 1, further comprising, during the first time period:
- at the first node:
  - transmitting a first ranging signal to the second node; and
  - recording a second transmit time of the first ranging signal from the first node;
- at the second node:
  - in response to receiving the first ranging signal, recording a fourth receive time of the first ranging signal at the second node;
  - based on the first ranging signal, recording a second partial channel state information characterizing the communication channel;
  - transmitting a second ranging signal to the first node; and
  - recording a third transmit time of the second ranging signal from the second node;
- at the first node:
  - in response to receiving the second ranging signal, recording a fifth receive time of the second ranging signal at the first node; and
  - based on the second ranging signal, recording third partial channel state information characterizing the communication channel; and
- calculating the first channel response based on:
  - the second partial channel state information;
  - the third partial channel state information;
  - the second transmit time of the first ranging signal;
  - the third transmit time of the second ranging signal;
  - the fourth receive time of the first ranging signal; and
  - the fifth receive time of the second ranging signal.

3. The method of claim 1, further comprising, during the first time period:
- in response to receiving a third signal from the first node, recording a second partial channel state information characterizing the communication channel based on the third signal; and
- calculating the first channel response based on the second partial channel state information and a first distance between the first node and the second node.

4. The method of claim 1:
- further comprising:
  - at a third node in the set of nodes:
    - receiving the first signal transmitted from the target device;
    - recording a fourth receive time of the first signal at the third node;
    - receiving the second signal transmitted from the first node;
    - recording a fifth receive time of the second signal at the third node; and
    - based on the second signal, recording a second partial channel state information characterizing a second communication channel between the first node and the third node for the second time period;
  - accessing a second channel response characterizing the second communication channel between the first node and the third node for the first time period;
  - in response to the first signal, calculating a second time bias between the first node and the third node based on:
    - the transmit time of the second signal from the first node;
    - the fifth receive time of the second signal at the third node;
    - the second channel response; and
    - the second partial channel state information;
  - estimating a first time-difference-of-arrival of the first signal at the first node and the second node based on:
    - the first receive time of the first signal at the first node;
    - the second receive time of the first signal at the second node; and
    - the time bias; and
  - estimating a second time-difference-of-arrival of the first signal at the first node and the third node based on:
    - the first receive time of the first signal at the first node;
    - the fourth receive time of the first signal at the third node; and
    - the second time bias; and
- wherein estimating the target position comprises estimating the target position of the target device based on:
  - the first time-difference-of-arrival of the first signal at the first node and the second node; and
  - the second time-difference-of-arrival of the first signal at the first node and the third node.

5. The method of claim 1:
- further comprising:
  - at the second node:
    - receiving a third signal transmitted from the target device; and
    - recording a fourth receive time of the third signal at the second node;
  - at a third node in the set of nodes:
    - receiving a third signal transmitted from the target device;
    - recording a fifth receive time of the third signal at the third node;
    - receiving the second signal transmitted from the first node;
    - recording a sixth receive time of the second signal at the third node; and
    - based on the second signal, recording a second partial channel state information characterizing a second communication channel between the first node and the third node for the second time period;
  - accessing a second channel response characterizing the second communication channel between the first node and the third node for the first time period;
  - calculating a second time bias between the first node and the third node based on:
    - the transmit time of the second signal from the first node;
    - the sixth receive time of the second signal at the third node;
    - the second channel response; and
    - the second partial channel state information;
  - estimating a first time-difference-of-arrival of the first signal at the first node and the second node based on:
    - the first receive time of the first signal at the first node;
    - the second receive time of the first signal at the second node; and
    - the time bias; and
  - estimating a second time-difference-of-arrival of the third signal at the second node and the third node based on:
    - the fourth receive time of the third signal at the second node;

the fifth receive time of the third signal at the third node; and the second time bias; and wherein estimating the target position comprises estimating the target position of the target device based on:

the first time-difference-of-arrival of the first signal at the first node and the second node; and the second time-difference-of-arrival of the third signal at the second node and the third node.

6. The method of claim 1, wherein calculating the time bias comprises calculating the time bias based on:

the transmit time of the second signal from the first node;

the third receive time of the second signal at the second node; and a quotient of the first partial channel state information and the first channel response.

7. The method of claim 1, wherein calculating the time bias comprises:

calculating a first square of the first partial channel state information;

calculating a second square of the first channel response; and calculating the time bias based on:

the transmit time of the second signal from the first node;

the third receive time of the second signal at the second node;

the first square of the first channel state information; and the second square of the first channel response.

8. The method of claim 1, wherein calculating the time bias comprises:

calculating a first duration between the second receive time, of the first signal at the second node, and the third receive time of the second signal at the second node; and calculating the time bias in response to the first duration falling below a threshold duration.

9. The method of claim 1:

wherein transmitting the second signal comprises transmitting the second signal comprising a multicast synchronization signal in response to receiving the first signal at the first node; and wherein calculating the time bias comprises calculating the time bias based on:

the transmit time of the multicast synchronization signal from the first node;

the third receive time of the multicast synchronization signal at the second node;

the first channel response; and the first partial channel state information.

10. The method of claim 1:

wherein receiving the first signal at the first device comprises receiving the first signal comprising an acknowledgement signal responsive to the second signal transmitted from the first node; and wherein estimating a target position comprises estimating the target position of the target device based on:

the first receive time of the acknowledgement signal at the first node;

the second receive time of the acknowledgement signal at the second node; and the time bias.

11. The method of claim 1:

wherein recording the first receive time comprises recording the first receive time of the first signal at the first node based on a first timing reference characterized by a first clock frequency;

wherein recording the second receive time comprises recording the second receive time of the first signal at the second node based on a second timing reference characterized by a second clock frequency different from the first clock frequency;

wherein calculating the time bias comprises calculating a clock phase difference based on:

the transmit time of the second signal from the first node;

the third receive time of the second signal at the second node;

the first channel response; and the first partial channel state information; and wherein estimating the target position of the target device comprises:

calculating a clock frequency offset based on the first clock frequency and the second clock frequency; and estimating the target position of the target device based on:

the first receive time of the first signal at the first node;

the second receive time of the first signal at the second node;

the clock phase difference; and the clock frequency offset.

12. The method of claim 1:

wherein accessing the first channel response comprises:

during a third time period preceding the second time period, storing the first channel response in the second node; and during the second time period, accessing the first channel response at the second node; and wherein calculating the time bias comprises calculating the time bias at the second node.

13. The method of claim 1, wherein calculating the time bias comprises:

accessing a first distance between the first node and the second node; and calculating the time bias between the first node and the second node based on:

the transmit time of the second signal from the first node;

the third receive time of the second signal at the second node;

the first channel response;

the first partial channel state information; and the first distance between the first node and the second node.

14. The method of claim 1:

wherein receiving the first signal at the second node comprises receiving a set of signals transmitted from the target device, the set of signals comprising the first signal and a third signal;

wherein recording the second receive time of the first signal comprises recording a set of receive times of the set of signals at the second node, the set of receive times comprising:

the second receive time of the first signal at the second node; and a fourth receive time of the third signal at the second node;

further comprising:
based on the set of signals, recording a set of partial channel state information characterizing a second communication channel between the second node and the target device;
calculating combined partial channel state information relative to the third signal based on the set of partial channel state information;
estimating a first time difference and a first phase difference for the first signal based on the combined partial channel state information; and
calculating an adjusted second receive time of the first signal based on:
the second receive time of the first signal at the second node;
the first time difference; and
the first phase difference; and
wherein estimating the target position comprises estimating the target position of the target device based on:
the first receive time of the first signal at the first node;
the adjusted second receive time of the first signal; and
the time bias.

15. A method comprising:
at a first node in a set of nodes:
receiving a first subset of signals in a set of signals transmitted from a target device, the first subset of signals comprising a first signal and excluding a third signal;
recording a first set of receive times of the first subset of signals at the first node, the first set of receive times comprising a first receive time of the first signal at the first node;
transmitting a second signal from the first node; and
recording a transmit time of the second signal from the first node;
at a second node in the set of nodes:
receiving a second subset of signals in the set of signals transmitted from the target device, the second subset of signals comprising the first signal and the third signal;
recording a second set of receive times of the second subset of signals at the second node, the second set of receive times comprising:
a second receive time of the first signal at the second node; and
a fourth receive time of the third signal at the second node;
receiving the second signal transmitted from the first node;
recording a third receive time of the second signal at the second node; and
based on the second signal, recording a first partial channel state information characterizing a communication channel between the first node and the second node for a second time period;
at a third node in the set of nodes:
in response to receiving a third subset of signals, in the set of signals and comprising the third signal, recording a third set of receive times of the third subset of signals at the third node, the third set of receive times comprising a fifth receive time of the third signal at the third node; and
in response to receiving the second signal transmitted from the first node, recording a sixth receive time of the second signal at the third node;
accessing a first channel response characterizing the communication channel between the first node and the second node for a first time period preceding the second time period;
in response to the first signal, calculating a time bias between the first node and the second node based on:
the transmit time of the second signal from the first node;
the third receive time of the second signal at the second node;
the first channel response; and
the first partial channel state information;
estimating a first time-difference-of-arrival of the first signal at the first node and the second node based on:
the first set of receive times of the first subset of signals at the first node;
the second set of receive times of the second subset of signals at the second node; and
the time bias;
estimating a second time-difference-of-arrival of the third signal at the second node and the third node based on:
the second set of receive times of the second subset of signals at the second node;
the third set of receive times of the third subset of signals at the third node;
the time bias between the first node and the second node; and
a second time bias between the first node and the third node; and
estimating a target position of the target device based on:
the first time-difference-of-arrival of the first signal at the first node and the second node; and
the second time-difference-of-arrival of the third signal at the second node and the third node.

16. The method of claim 15, further comprising:
at the third node, based on the second signal, recording a second partial channel state information characterizing a second communication channel between the first node and the third node for the second time period; and
calculating the second time bias between the first node and the third node based on:
the transmit time of the second signal from the first node;
the sixth receive time of the second signal at the third node;
a second channel response characterizing the second communication channel between the first node and the third node; and
the second partial channel state information.

17. A method comprising:
at a sniffer node in a set of nodes:
receiving a first signal transmitted from a target device;
recording a second receive time of the first signal at the sniffer node;
receiving a second signal transmitted from a master node in the set of nodes;
recording a third receive time of the second signal at the sniffer node; and
based on the second signal, recording a first partial channel state information characterizing a communication channel between the master node and the sniffer node for a second time period;
during a first time period preceding the second time period:
in response to receiving a third signal from the master node, recording a fourth receive time of the third signal at the sniffer node;

based on the third signal, recording a second partial channel state information characterizing the communication channel; and calculating a first channel response based on the second partial channel state information and a first distance between the master node and the sniffer node;

accessing the first channel response characterizing the communication channel between the master node and the sniffer node for the first time period;

in response to the first signal, calculating a clock phase difference between the master node and the sniffer node based on:

a transmit time of the second signal from the master node;

the third receive time of the second signal at the sniffer node;

the first channel response; and the first partial channel state information; and estimating a target position of the target device based on:

a first receive time of the first signal at the master node;

the second receive time of the first signal at the sniffer node; and the clock phase difference.

18. A method comprising:

at a first node in a set of nodes:

receiving a first signal transmitted from a target device;

recording a first receive time of the first signal at the first node;

transmitting a second signal from the first node; and recording a transmit time of the second signal from the first node;

at a second node in the set of nodes:

receiving the first signal transmitted from the target device;

recording a second receive time of the first signal at the second node;

receiving the second signal transmitted from the first node;

recording a third receive time of the second signal at the second node; and based on the second signal, recording a first partial channel state information characterizing a communication channel between the first node and the second node for a second time period;

accessing a first channel response characterizing the communication channel between the first node and the second node for a first time period preceding the second time period;

in response to the first signal, calculating a time bias between the first node and the second node based on:

the transmit time of the second signal from the first node;

the third receive time of the second signal at the second node;

the first channel response;

the first partial channel state information; and a first distance between the first node and the second node; and estimating a target position of the target device based on:

the first receive time of the first signal at the first node;

the second receive time of the first signal at the second node; and the time bias.

\* \* \* \* \*